United States Patent
Dropps et al.

(10) Patent No.: US 11,184,103 B1
(45) Date of Patent: Nov. 23, 2021

(54) DYNAMIC BANDWIDTH SHARING ON A FIBER LOOP USING SILICON PHOTONICS

(71) Applicant: HEWLETT PACKARD ENTERPRISE DEVELOPMENT LP, Houston, TX (US)

(72) Inventors: Frank R. Dropps, Eagan, MN (US); Mir Ashkan Seyedi, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/882,411

(22) Filed: May 22, 2020

(51) Int. Cl.
*H04J 14/02* (2006.01)
*H04L 12/427* (2006.01)

(52) U.S. Cl.
CPC ...... *H04J 14/0257* (2013.01); *H04J 14/0268* (2013.01); *H04J 14/0282* (2013.01); *H04L 12/427* (2013.01)

(58) Field of Classification Search
CPC .............. H04J 14/0257; H04J 14/0282; H04J 14/0268; H04L 12/427
See application file for complete search history.

(56) References Cited

U.S. PATENT DOCUMENTS

| | | | |
|---|---|---|---|
| 7,085,281 | B2 | 8/2006 | Thomas et al. |
| 7,602,807 | B2 | 10/2009 | Zadikian et al. |
| 7,974,532 | B2 | 7/2011 | Sala et al. |
| 9,178,646 | B2 * | 11/2015 | Sarashina ............ H04J 14/0252 |
| 2006/0051091 | A1 * | 3/2006 | Kinoshita ............ H04J 14/0227 398/59 |
| 2010/0246393 | A1 * | 9/2010 | Chamas ................ H04L 47/70 370/230 |
| 2014/0161449 | A1 * | 6/2014 | Doerr .................. H04J 14/0257 398/49 |
| 2019/0363787 | A1 * | 11/2019 | Edwards .............. H04B 10/032 |

OTHER PUBLICATIONS

Beigi, M. V., et al.; "Min: A Power Efficient Mechanism to Mitigate the Impact of Process Variations on Nanophotonic Networks"; ISLPED'14; Aug. 11-13, 2014; pp. 299-302; ACM; La Jolla, CA, USA.

Chittamuru, S. V. R., et al.; "A Reconfigurable Silicon-Photonic Network with Improved Channel Sharing for Multicore Architectures"; GLSVLSI'15; May 20-22, 2015; pp. 63-68; ACM; Pittsburgh, PA, USA.

* cited by examiner

*Primary Examiner* — Tanya T Motsinger
(74) *Attorney, Agent, or Firm* — Hewlett Packard Enterprise Patent Department

(57) ABSTRACT

A fiber loop includes a plurality of processors coupled to each other and a controller coupled to each of the plurality of processors. The controller is configured to: assign to each of the plurality of processors a number of wavelengths for interconnect communications between the plurality of processors; receive, from a first processor of the plurality of processors, a request for one or more additional wavelengths; determine whether an interconnect bandwidth utilization on the fiber loop is less than a threshold; and in response to determining that the interconnect bandwidth utilization on the fiber loop is less than the threshold, reassign, to the first processor, one or more wavelengths that are assigned to a second processor of the plurality of processors.

17 Claims, 5 Drawing Sheets

DYNAMIC BANDWIDTH SHARING ON A FIBER LOOP USING SILICON PHOTONICS

DESCRIPTION OF RELATED ART

A multiprocessor multi socket system generally is composed of discrete processor sockets or processor chips that adhere to a cache coherency protocol across an interconnect network. One of the factors that affects system performance is the interconnect bandwidth. Currently passive copper cables are used in interconnect among the processor sockets. The use of copper cables is generally cost effective. As is well understood, there are bandwidth limitations with copper cables. For example, an interconnect link rate is at 56 GT/s with four lanes. To double the interconnect bandwidth to four lanes at 112 GT/s, the number of lanes may be increased to eight. The system performance would benefit from increased interconnect bandwidth. As a result, an optical interconnect may be employed to further increase the capacity of the interconnect communications to improve system performance.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Disclosed is an optical fiber loop that provides increased bandwidth and flexible bandwidth assignment. Silicon photonic technologies may be employed in the fiber loop to provide a cost effective, high bandwidth, low latency processor socket interconnect. This disclosure provides a solution for further enhancing the use of silicon photonics in multiple optical loop configurations. Bandwidth load balancing on the silicon photonic optical loop is introduced.

Silicon photonic technologies integrate optical transceivers and/or optical paths on a semiconductor substrate. Silicon photonic technologies can provide a hybrid device that includes both the electrical domain, e.g., a processor, and the optical domain, e.g., optical transceiver. The techniques disclosed herein provide methods to leverage the silicon photonic technologies to provide flexible bandwidth assignments that can improve the overall performance of a loop of processor sockets.

Figure 1:
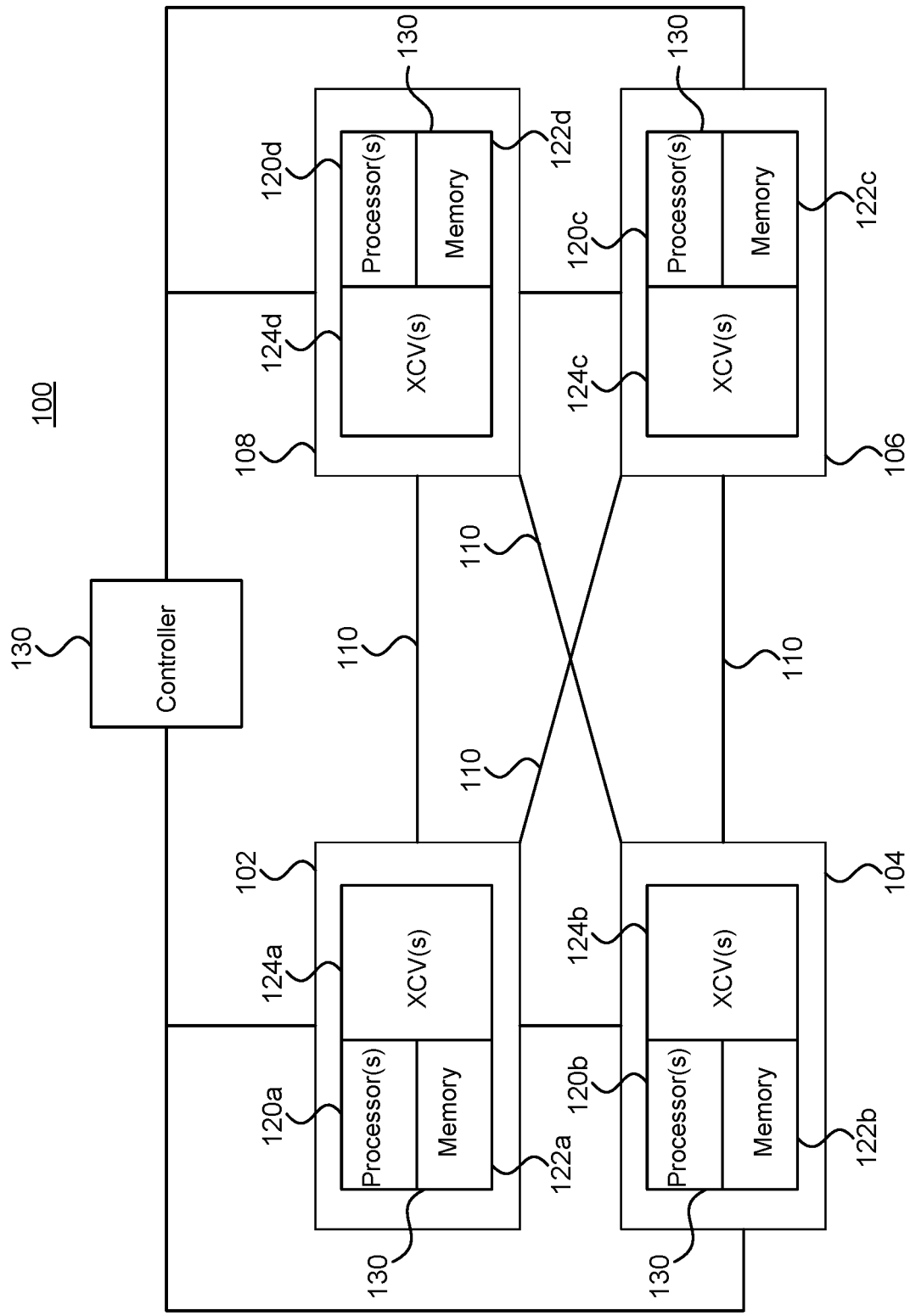
FIG. 1 is a block diagram illustrating a fiber loop configured to implement techniques for dynamic bandwidth sharing, according to one example embodiment.

Reference is now made to FIG. 1. FIG. 1 illustrates an optical fiber loop 100 according to one example embodiment. The fiber loop 100 includes four nodes 102, 104, 106, and 108 coupled to each other via optical cables 110. Each of the nodes 102, 104, 106, and 108, includes one or more processors 120 (e.g., identified individually as 120a for node 102, 120b for node 104, 120c for node 106, 120d for node 108), a memory 122 (e.g., identified individually as 122a for node 102, 122b for node 104, 122c for node 106, 122d for node 108), and one or more transceivers (XCV) 124 (e.g., identified individually as 124a for node 102, 124b for node 104, 124c for node 106, 124d for node 108). The fiber loop 100 further includes a controller 130 coupled to each of the nodes 102-108 in the loop. It should be understood that although four nodes are illustrated in FIG. 1, more or fewer nodes may be included in the fiber loop 100.

In the illustrated embodiment, the processor(s) 120, the memory 122 and the optical transceiver(s) 124 of each node 102, 104, 106, 108 may constitute a respective application-specific integrated circuit (ASIC) 130 implemented with silicon photonic technologies. For example, they may be formed on the same semiconductor substrate using, complementary metal-oxide-semiconductor (CMOS) manufacturing processes. Other semiconductor technologies are contemplated for forming the ASICs 130. Each of the processors 120 may be a single core or multi-core processor. No particularly limitation is imposed on the configuration of the processors 120. The memory 122 may include read-only memory (ROM), random access memory (RAM), magnetic disk storage media devices, optical storage media devices, flash memory devices, electrical, optical or other physical/tangible memory storage devices. The memory 122 is configured to store instructions, software programs, and logics for the processor(s) 120. The processor(s) 120 is configured to execute instructions, software programs, and logics to perform computing tasks for the nodes. Each of the transceivers 124 is configured to receive optical signals from the other respective transceivers through the optical cables 110 and to convert the received optical signals into electrical signals for the processor(s) 120. Further, each of the transceivers 124 is configured to convert electrical signals from the processor(s) 120 to optical signals and transmit the optical signals through the optical cables 110 to the other respective transceivers 124 of a destination node or destination nodes.

The optical loop 100 is implemented with an all-to-all topography, in which each of the nodes is coupled to all other nodes in the loop 100. On the silicon photonics optical loop 100, each node may use multiple optical wavelengths to encode data messages. As a non-limiting example, each node may nominally use 16 optical wavelengths, each modulated at 28 Gb/s for each destination node on the loop 100. In the illustrated embodiment, each node may use 48 optical wavelengths to communicate with the other 3 nodes on the loop 100. That is, node 102 uses 16 unique wavelengths to communicate to node 104, 16 unique wavelengths to communicate to node 106, and 16 unique wavelengths to communicate to node 108.

Simultaneously and without interference, node 104 uses 16 unique wavelengths to communicate to node 106, 16 unique wavelengths to communicate to node 108, and 16 unique wavelengths to communicate to node 102, and so on. In this example configuration, the silicon photonic components are configured to support 192 unique wavelengths. Other implementations are possible. For example, depending on the needs, more or fewer than 192 wavelengths may be deployed in a loop.

The controller 130 may also include an ASIC configured to manage the communications among the nodes 102-108.

The controller 130 is coupled to each of the nodes 102-108 to provide instructions and notifications to the nodes 102-108 and to obtain status reports or wavelength needs from the nodes 102-108. For example, a node may report that it is currently idle or under a reboot and thus needs no wavelength for communication. As another example, a node may report that it is relocating or replicating virtual machines to other nodes and thus needs more bandwidth. In some embodiments, the controller 130 is configured to dynamically assign wavelengths to each of the processors 120 in the loop 100. As a non-limiting example, when the loop 100 is booted up, the controller 130 is configured to assign a fixed number of wavelengths for interconnect communications between the processors 120. As explained above, for example, the controller 130 may assign 48 wavelengths to each of the nodes 102-108, to allow each of the nodes to use 16 wavelengths to communicate with another node.

The controller 130 is further configured to reassign the wavelengths based on interconnect bandwidth utilization in the loop 100 and the needs of the processors. As a non-limiting example, one or more of the processors 120 may send to the controller 130 a request for additional one or more wavelengths. Upon receiving the request, the controller 130 may determine whether there are extra wavelengths available to fulfill the new demand. In some embodiments, the loop 100 may have extra wavelengths that have not been assigned to the nodes. The controller 130 can then tap the unassigned wavelengths and allows the requesting processor to use those wavelengths.

In another non-limiting example, when the loop 100 has no extra wavelengths available that have not been assigned to any processors, the controller 130 is configured to determine if other processors are not utilizing the wavelengths assigned to them in a full capacity.

In particular, the controller 130 can determine whether an interconnect bandwidth utilization on the fiber loop 100 is less than a threshold. As a non-limiting example, a bandwidth utilization threshold may be set to reserve some wavelengths for link failures. If the interconnect bandwidth utilization is less than the threshold, the request for additional wavelengths can be granted. The controller 130 is configured to reassign, to the requesting processor, one or more wavelengths that are assigned to another processor. If a processor 120 needs more bandwidth to perform its tasks such as migrating and replicating a virtual machine, it can request to borrow wavelengths from other processors of other nodes. This allows increased bandwidth for the requesting processor. As a non-limiting example, the node 102 is communicating with node 106 with a bandwidth of 16 wavelengths. The node 102 detects that a back pressure has been reached and makes a request to the controller 130 to use additional bandwidth on the optical loop 100. The request may be fulfilled by using optical wavelengths currently assigned to another node. For example, when the node 104 is currently undersubscribed to the wavelengths assigned to it and has extra bandwidth available (e.g. 8 optical wavelengths), the node 104 can lend node 102 some of its 48 optical wavelengths (e.g., the 8 optical wavelengths). After receiving confirmation from the controller 130 to borrow, for example, 8 optical wavelengths, the node 102 can now use 24 optical wavelengths to communicate with the node 106, delivering a transmission rate at 84 GBytes/s, an increase over the standard 56 GBytes/s of its 16 wavelengths that is originally assigned. However, if the interconnect bandwidth utilization of the other node(s) is equal to or greater than the threshold, the request for additional wavelengths may be denied because no additional wavelengths are available for re-assignment.

In some embodiments, the controller 130 may receive a request for returning borrowed wavelengths from one of the processors 120. To continue the example above, the node 102 uses 8 additional wavelengths borrowed from the node 104 to communicate with the node 106. After the node 102 completes the communication and no longer needs the additional wavelengths, the node 102 may send a request for returning the borrowed wavelengths to the controller 130. Upon receiving the request for returning, the controller 130 may prioritize the returning request over any request for additional wavelengths. This allows the controller 130 to have full or complete knowledge of the entire interconnect bandwidth utilization on the fiber loop 100. That is, the controller 130 can process the request for returning and use the returned wavelengths to calculate/update the interconnect bandwidth utilization. If the updated interconnect bandwidth utilization is less than the utilization threshold, the controller 130, upon processing the request for additional wavelengths, can grant the request and reassign wavelengths of another processor to the requesting processor.

In some embodiments, the controller 130 is further configured to dynamically manage the fiber loop 100 such that the interconnect bandwidth utilization on the fiber loop 100 is generally less than the utilization threshold. As a non-limiting example, upon determining that the interconnect bandwidth utilization on the fiber loop 100 is equal to or greater than the utilization threshold (i.e., oversubscription of the bandwidth on the fiber loop 100), the controller 130 may start a timer. At a later time, if the oversubscription persists, the controller 130 is configured to determine whether a time period between the start time of the timer and the later time is greater than a time threshold. The time threshold may be defined based on whether the persistence of the oversubscription negatively affects the overall performance of the fiber loop. A system administrator and the controller 130 may be set up the time threshold based on historical performance data.

In response to determining that the time period is greater than the time threshold, the controller 130 is configured to determine whether there is a reassigned/borrowed wavelength that has not been returned. For example, the controller 130 can determine whether a processor of a first node has borrowed one or more wavelengths from another processor of a second node and not returned the borrowed wavelength(s). And when the controller 130 determines that there is a reassigned wavelength that has not been returned, the controller 130 is configured to transmit a notification to the processor that borrowed the reassigned wavelength(s), requesting the borrowing processor to return the reassigned wavelength(s). To avoid interrupting the task the borrowing processor is undertaking, the controller 130 may allow the borrowing processor to complete its current tasks before turning off the borrowed links that use the borrowed wavelengths. The controller 130 may determine a turn off time based on the status reports from the nodes 102-108.

Further, based on the status reports from the nodes 102-108, the controller 130 may determine a maximum limit of wavelengths that are available for borrow/reassignment. The controller 130 may periodically determine the maximum limit based on how many wavelengths assigned to the processors 120 are not utilized by the processors 120. For example, the processor 120a of the node 102 may not use any of the wavelengths assigned to it for communication with the node 104. As a result, those wavelengths may be borrowed by another node for interconnect communications.

Upon receiving a request for additional wavelengths, the controller 130 may determine whether that there is a reassigned wavelength that has not been returned. If so, the controller 130 may demand the borrowing processor to return the borrowed wavelengths. If there is no reassigned wavelength that has not been returned, the controller 130 may proceed to determine whether the requested additional wavelengths is greater than the maximum number of wavelengths that are allowed to be borrowed in the fiber loop 100. When the controller 130 determines that the requested additional wavelengths is not greater than the maximum number of wavelengths that are allowed to be borrowed in the fiber loop 100, the controller 130 reassigns to the requesting processor one or more wavelengths that are previously assigned to another processor. When the controller 130 determines that the requested additional wavelengths is greater than the maximum number of wavelengths that are allowed to be borrowed in the fiber loop 100, the controller 130 denies the request or downgrades the request to a smaller number of wavelengths and sends a notification to the requesting processor. In some embodiments, the notification may indicate the maximum number of wavelengths that are available for borrowing so that the requesting processor may modify its request to a number under the maximum number.

In another embodiment, the functionality performed by the controller (130) can be provided by one of the connected nodes 102, 104, 106 or 108. In yet another embodiment the functionality is distributed between the connected nodes 102, 104, 106 and/or 108. In this embodiment peer requests are made between nodes to request or surrender additional wavelength resulting in the changes in available bandwidth allocation.

In some embodiments, links 110 maybe electrical connections and multiple controllers 130 may be interconnected together using optical loops to interconnect larger systems. As a non-limiting example, each of the nodes 102, 104, 106, and 108 may be a server in a server rack or a server rack in a data center. The optical loop 100 can be applied to any systems that employs optical interconnections.

Figure 2:
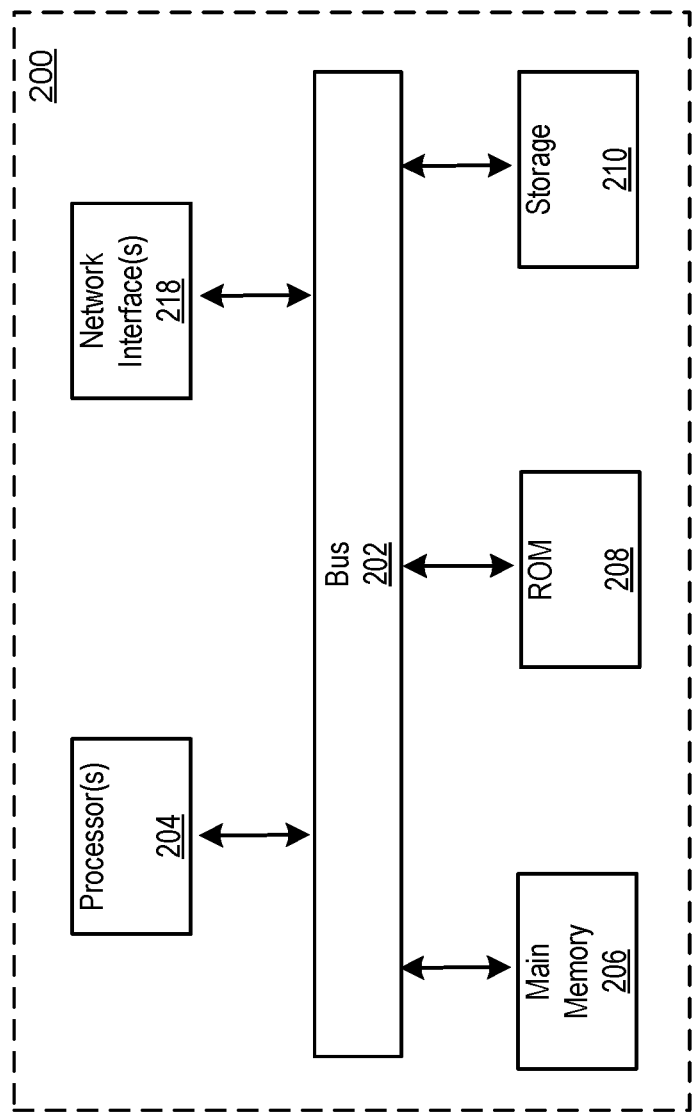
FIG. 2 is a block diagram of a fiber loop controller, according to one example embodiment.

FIG. 2 is a block diagram of a fiber loop controller 200, according to one example embodiment. The fiber loop controller 200 may be the controller 130 of FIG. 1. In some embodiments, when the functions of the controller 130 are performed by one or more of the nodes in the optical loop, the fiber loop controller 200 can be embodied in the node 102, 104, 106, and/or 108.

100 of FIG. 1. The controller 200 includes a bus 202 or other communication mechanism for communicating information, one or more hardware processors 204 coupled with bus 202 for processing information. Hardware processor(s) 202 may be, for example, one or more general purpose microprocessors.

The controller 200 also includes a main memory 206, such as a random access memory (RAM), cache and/or other dynamic storage devices, coupled to bus 202 for storing information and instructions to be executed by processor 204. Main memory 206 also may be used for storing temporary variables or other intermediate information during execution of instructions to be executed by processor 204. Such instructions, when stored in storage media accessible to processor 204, render controller 200 into a special-purpose machine that is customized to perform the operations specified in the instructions consistent with the techniques disclosed herein.

The controller 200 further includes a read only memory (ROM) 208 or other static storage device coupled to bus 202 for storing static information and instructions for processor 204. A storage device 210, such as a magnetic disk, optical disk, or USB thumb drive (Flash drive), etc., is provided and coupled to bus 202 for storing information and instructions.

In some implementations, the functions of the processor 202 may be implemented by logic encoded in one or more tangible (non-transitory) computer-readable storage media (e.g., embedded logic such as an application specific integrated circuit, digital signal processor instructions, software that is executed by a processor, etc.), wherein the main memory 206 and the ROM 208 store data used for the operations described herein and store software or processor executable instructions that are executed to carry out the operations described herein.

The instructions or software programs for the techniques disclosed herein may be embodied in one or more non-transitory computer-readable storage media encoded with software comprising computer executable instructions and when instructions or software programs are executed operable to perform the operations described herein.

The fiber loop controller 200 also includes a network interface 212 coupled to bus 202. Network interface 212 provides a two-way data communication coupling to one or more network links that are connected to one or more local networks. For example, communication interface 212 may be an integrated services digital network (ISDN) card, cable modem, satellite modem, or a modem to provide a data communication connection to a corresponding type of telephone line. As another example, network interface 212 may be a local area network (LAN) card to provide a data communication connection to a compatible LAN (or WAN component to communicated with a WAN). Wireless links may also be implemented. In any such implementation, network interface 212 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through network interface 212, which carry the digital data to and from the fiber loop controller 200, are example forms of transmission media.

The fiber loop controller 200 can send messages and receive data, including program code, through the network(s), network link and network interface 212. In the Internet example, a server might transmit a requested code for an application program through the Internet, the ISP, the local network and the network interface 212.

The received code may be executed by processor 204 as it is received, and/or stored in storage device 210, or other non-volatile storage for later execution.

In another example embodiment, controller 130 may be a hardware controlled state machine used to manage the wavelength assignment. The hardware state machine controller 130 may be included in other system components such as processor sockets and node controllers. These node controllers could be used to interconnect groups of processor sockets to form a multi-processor system. Because each local processor may use cache memories, there is a need to maintain coherency across multiple distributed cache memories using node controllers. A cache coherent system presents a simpler programming model for applications.

Figure 3:
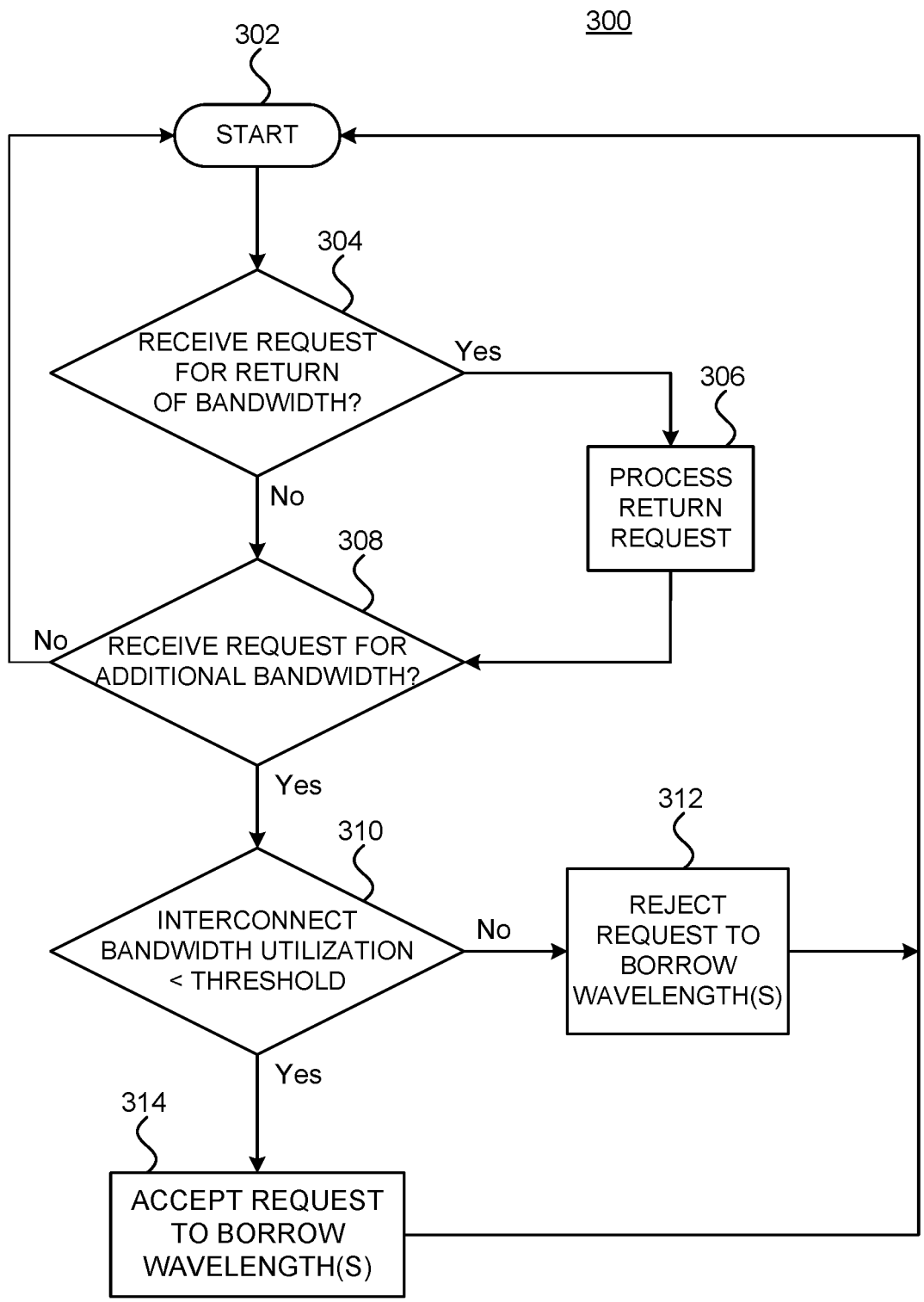
FIG. 3 is a flow chart illustrating a method for managing bandwidth assignments to nodes in a silicon photonics fiber loop, according to various example embodiments.

FIG. 3 is a flow chart illustrating a method 300 for managing bandwidth assignments to nodes in a silicon photonics fiber loop according to various example embodiments of this disclosure. For example, the method 300 may be performed by a fiber loop controller, such as the controller 130 of FIG. 1. The method 300 starts at 302. At 304, the controller determines whether a request for return of bandwidth is received. The nodes in the fiber loop are allowed to borrow additional bandwidth (wavelengths) from other nodes. Before the controller processes a request for borrowing additional wavelengths, the controller determines whether any request for returning wavelengths is received. If the controller determines that there is a request for returning wavelengths (Yes at 304), at 306 the controller processes the request for returning wavelengths. This allows the controller to properly determine the interconnect bandwidth utilization in the fiber loop, which further allows the controller to determine whether additional wavelengths are available for reassignment to other nodes that need them.

If the controller determines that no request for returning wavelengths is received (No at 304), at 308 the controller determines whether it receives a request for additional bandwidth from a processor in the fiber loop. When the controller determines that it receives no request for additional bandwidth from a processor (No at 308), the method 300 returns to 302. If the controller determines that it receives a request for additional bandwidth from a processor (Yes at 308), at 310 the controller determines whether the interconnect bandwidth utilization is less than a threshold. The threshold is a measure that determines whether the bandwidth utilization in the fiber loop has reached its capacity. For example, the threshold may be any suitable value at or between 80%-99.5% of the full bandwidth of the fiber loop.

If the controller determines that the interconnect bandwidth utilization is equal to or greater than the threshold (No at 310), at 312 the controller denies/rejects the request for additional bandwidth and the method 300 returns to 302. If the controller determines that the interconnect bandwidth utilization is less than the threshold (Yes at 310), at 314 the controller accepts the request for additional bandwidth and reassigns to the requesting processor wavelengths that are previously assigned to another processor.

These techniques allow a processor that needs additional wavelengths for interconnect communication to use idle bandwidth in the fiber loop. A controller is provided in the fiber loop to manage wavelengths assignment/allocation among the processors. As a result, the performance of the processors in the fiber loop can be improved and optimized.

Figure 4:
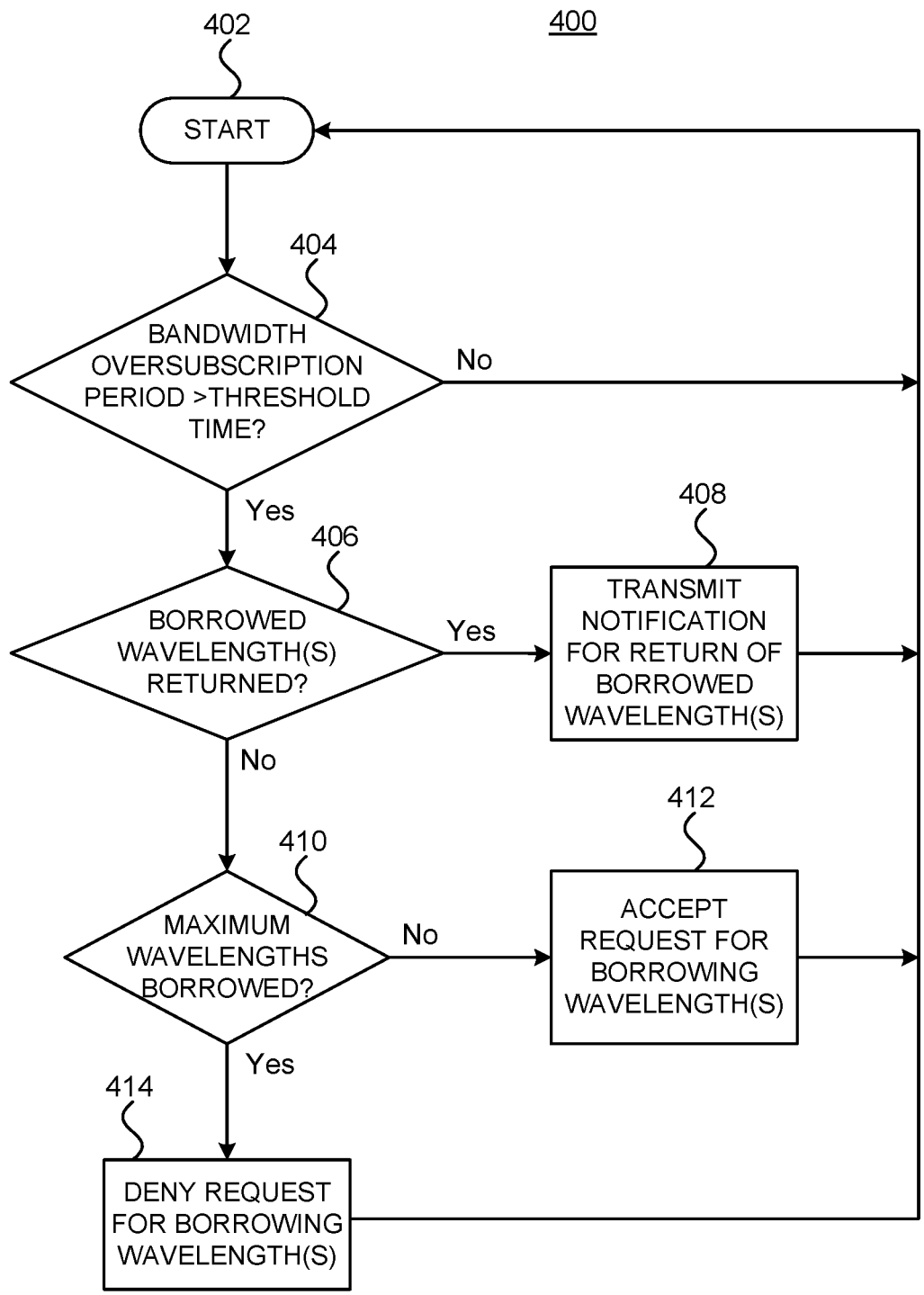
FIG. 4 is a flow chart illustrating another method for managing bandwidth assignments to nodes in a silicon photonics fiber loop, according to various example embodiments.

FIG. 4 is a flow chart illustrating another method 400 for managing bandwidth assignments to nodes in a silicon photonics fiber loop according to various example embodiments of this disclosure. For example, the method 400 may be performed by a fiber loop controller, such as the controller 130 of FIG. 1. The method 400 starts at 402. At 404, the controller determines whether a time period in which interconnect bandwidth of the fiber loop is oversubscribed is greater than a time threshold. When oversubscription of the interconnect bandwidth of the fiber loop prolongs, the performance of the nodes in the fiber loop may be degraded and may need a correction to the wavelength assignment.

If the controller determines that the time period in which interconnect bandwidth of the fiber loop is oversubscribed is not greater than the time threshold (No at 404), the method 400 returns to 402. The controller may be configured to periodically perform the determination at 404 to ensure the better performance of the fiber loop. For example, the controller may perform the determination at 406 every second, every five seconds, every minute, etc.

If the controller determines that the time period in which interconnect bandwidth of the fiber loop is oversubscribed is greater than the time threshold (Yes at 404), at 406 the controller determines whether there is a reassigned wavelength that has not been returned. As explained in connection with FIG. 3, the processors in the fiber loop can borrow wavelengths from another node or nodes. When the oversubscription of the interconnect bandwidth of the fiber loop prolongs, the controller is configured to determine if a borrowing processor that borrows wavelengths from another node has returned the wavelengths. In some embodiments, the controller may keep a record of the borrowing history. For example, the controller may store a table indicating the lender node/processor, the borrower node/processor, the number of wavelengths borrowed, a borrow time at which the borrowing starts, and a return time at which the wavelengths are returned to the lender node/processor. In some embodiments, at 406 the controller can examine the borrowing history and determine whether there is an entry indicating a reassigned/borrowed wavelength that has not been returned.

If the controller determines that there is a reassigned wavelength that has not been returned (Yes at 406), at 408 the controller transmits to the borrower processor a notification for return of borrowed wavelengths. The notification requests the borrower processor to return the borrowed wavelengths. The controller may allow the borrower processor to complete its tasks with the borrowed wavelengths or prescribe a time at which the borrower processor is required to return the borrowed wavelengths. In one implementation, when the prescribed time is due, the controller may turn off the links that use the borrowed wavelengths.

If the controller determines that there is no reassigned wavelength that has not been returned (No at 406), at 410 the controller is configured to determine whether the borrowed wavelengths reach the maximum wavelengths in the fiber loop. This allows the controller to respond to a request for additional wavelengths. If the borrowed wavelengths have not reached the maximum wavelengths in the fiber loop (No at 410), at 412 the controller may accept a request for borrowing wavelengths. If the maximum wavelengths in the fiber loop have been borrowed (Yes at 410), which indicates that no more wavelength in the fiber loop is available for re-assignment to a requesting processor, at 414 the controller denies a request for borrowing wavelengths.

Figure 5:
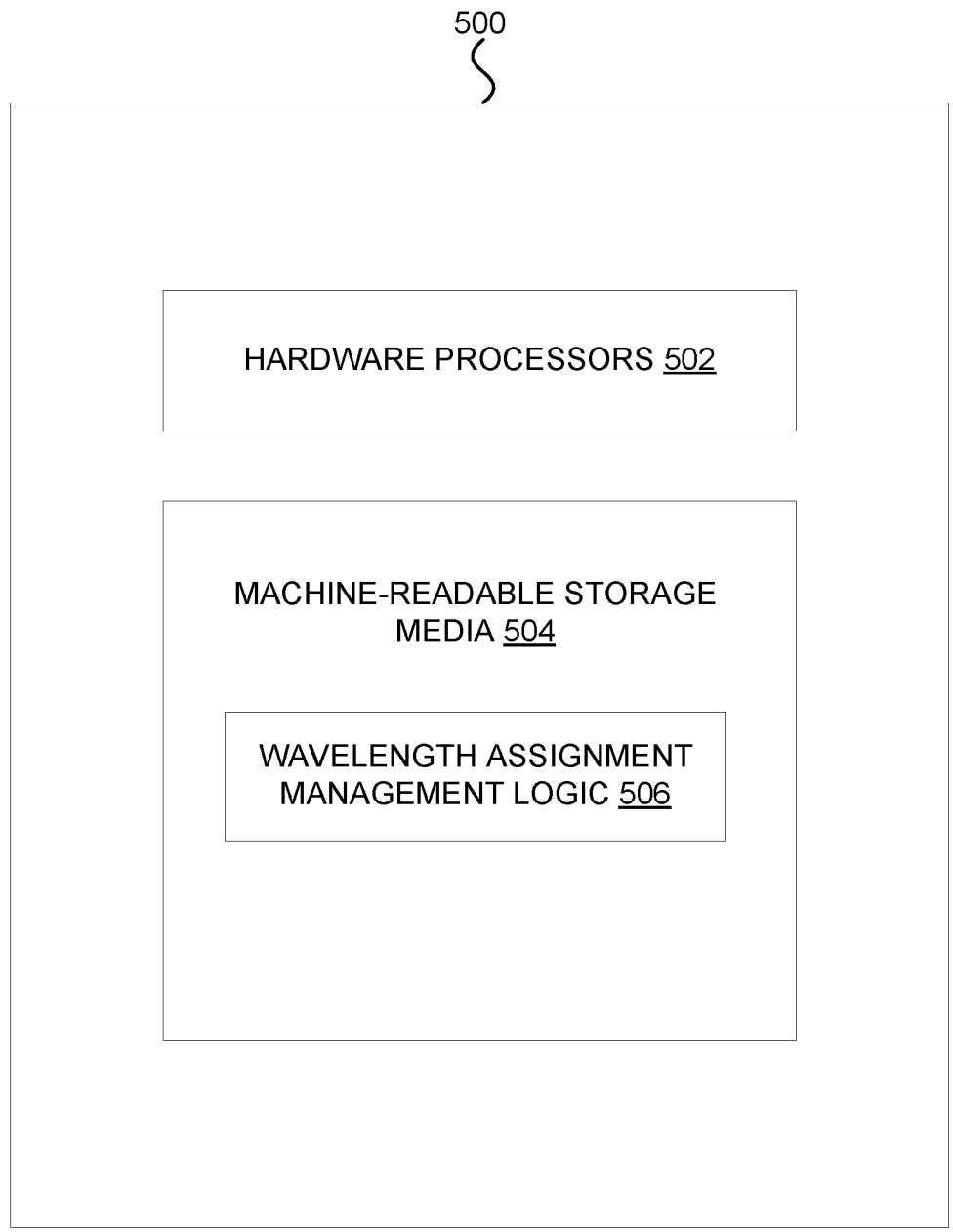
FIG. 5 is a block diagram illustrating a fiber loop controller, according to one example embodiment.

FIG. 5 is a block diagram illustrating a fiber loop controller 500, according to one example embodiment. The fiber loop controller 500 may be adopted as the controller 130 of FIG. 1. The fiber loop controller 500 includes one or more hardware processors 502 and one or more non-transitory machine-readable storage media 504. The machine-readable storage media 504 stores wavelength assignment management logic 506, such as those disclosed in FIGS. 3 and 4.

The fiber loop controller 500 may implement the techniques described herein using customized hard-wired logic, one or more ASICs or FPGAs, firmware and/or program logic which in combination with the computer system causes or programs the fiber loop controller 500 to be a special-purpose machine. According to one embodiment, the techniques herein are performed by the fiber loop controller 500 in response to processor(s) 502 executing one or more sequences of one or more instructions of the wavelength assignment management logic 506 contained in the storage media 504. Execution of the sequences of instructions contained in the storage media 504 causes processor(s) 502 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks. Volatile media includes dynamic memory. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

In summary, the disclosed techniques provide a solution for cost effective high bandwidth, low latency processor socket interconnect for fiber loop. These techniques further enhances the use of silicon photonics in the optical loop to dynamically assign wavelengths to the nodes and their processors to improve the performance of the fiber loop.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

In common usage, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusively" and "A and B, but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A fiber loop comprising:
   a plurality of processors coupled to each other; and
   a controller coupled to each of the plurality of processors, wherein the controller is configured to:
      assign to each of the plurality of processors a number of wavelengths for interconnect communications between the plurality of processors;
      receive, from a first processor of the plurality of processors, a request for one or more additional wavelengths;
      determine whether an interconnect bandwidth utilization on the fiber loop is less than a threshold;
      in response to determining that the interconnect bandwidth utilization on the fiber loop is less than the threshold, reassign, to the first processor, one or more wavelengths that are assigned to a second processor of the plurality of processors;
      determine whether a request for returning one or more wavelengths that are reassigned to a third processor of the plurality of processors is received; and
      in response to determining that the request for returning is received, process the request for returning before reassigning, to the first processor, the one or more wavelengths that are assigned to the second processor.

2. The fiber loop of claim 1, wherein the controller is further configured to:
   in response to determining that the interconnect bandwidth utilization on the fiber loop is equal to or greater than the threshold, deny the request from the first processor for one or more additional wavelengths.

3. The fiber loop of claim 1, wherein the plurality of processors are coupled to each other through a semiconductor photonics network.

4. A fiber loop comprising:
a plurality of processors coupled to each other; and
a controller coupled to each of the plurality of processors, wherein the controller is configured to:
assign to each of the plurality of processors a number of wavelengths for interconnect communications between the plurality of processors;
receive, from a first processor of the plurality of processors, a request for one or more additional wavelengths;
determine whether an interconnect bandwidth utilization on the fiber loop is less than a threshold;
in response to determining that the interconnect bandwidth utilization on the fiber loop is less than the threshold, reassiqn, to the first processor, one or more wavelenaths that are assigned to a second processor of the plurality of processors;
determine whether a time period in which interconnect bandwidth of the fiber loop is oversubscribed is greater than a time threshold; and
in response to determining that the time period is greater than the time threshold, determine whether there is a reassigned wavelength that has not been returned.

5. The fiber loop of claim 4, wherein the controller is further configured to:
in response to determining that there is a reassigned wavelength that has not been returned, transmit a notification to one of the processors that borrows the reassigned wavelength, wherein the notification requests the one of the processors to return the reassigned wavelength.

6. The fiber loop of claim 4, wherein the controller is further configured to:
in response to determining that there is no reassigned wavelength in the fiber loop, determine whether the one or more additional wavelengths requested by the first processor is greater than a maximum number of wavelengths that are allowed to be borrowed in the fiber loop; and
in response to determining that the one or more additional wavelengths requested by the first processor is not greater than the maximum number of wavelengths that are allowed to be borrowed in the fiber loop, transmit the request from the first processor for the one or more additional wavelengths to the second processor.

7. A method comprising:
assigning, by a processor coupled to a plurality of processors, to each of the plurality of processors a number of wavelengths for interconnect communications between the plurality of processors;
receiving, from a first processor of the plurality of processors, a request for one or more additional wavelengths;
determining whether an interconnect bandwidth utilization on the fiber loop is less than a threshold;
in response to determining that the interconnect bandwidth utilization on the fiber loop is less than the threshold, reassigning, to the first processor, one or more wavelengths that are assigned to a second processor of the plurality of processors;
determining whether a request for returning one or more wavelengths that are reassigned to a third processor of the plurality of processors is received; and
in response to determining that the request for returning is received, processing the request for returning before reassigning, to the first processor, the one or more wavelengths that are assigned to the second processor.

8. The method of claim 7, further comprising:
in response to determining that the interconnect bandwidth utilization on the fiber loop is equal to or greater than the threshold, denying the request from the first processor for one or more additional wavelengths.

9. The method of claim 7, wherein the plurality of processors are coupled to each other through a semiconductor photonics network.

10. A method comprising:
assigning, by a processor coupled to a plurality of processors, to each of the plurality of processors a number of wavelengths for interconnect communications between the plurality of processors;
receiving, from a first processor of the plurality of processors, a request for one or more additional wavelengths;
determining whether an interconnect bandwidth utilization on the fiber loop is less than a threshold;
in response to determining that the interconnect bandwidth utilization on the fiber loop is less than the threshold, reassigning, to the first processor, one or more wavelengths that are assigned to a second processor of the plurality of processors;
determining whether a time period in which interconnect bandwidth of the fiber loop is oversubscribed is greater than a time threshold; and
in response to determining that the time period is greater than the time threshold, determining whether there is a reassigned wavelength that has not been returned.

11. The method of claim 10, further comprising:
in response to determining that there is a reassigned wavelength that has not been returned, transmitting a notification to one of the processors that borrows the reassigned wavelength, wherein the notification requests the one of the processors to return the reassigned wavelength.

12. The method of claim 10, further comprising:
in response to determining that there is no reassigned wavelength in the fiber loop, determining whether the one or more additional wavelengths requested by the first processor is greater than a maximum number of wavelengths that are allowed to be borrowed in the fiber loop; and
in response to determining that the one or more additional wavelengths requested by the first processor is not greater than the maximum number of wavelengths that are allowed to be borrowed in the fiber loop, transmitting the request from the first processor for the one or more additional wavelengths to the second processor.

13. One or more non-transitory computer-readable storage media storing instructions that, when executed by one or more processors, cause the one or more processors to:
assign to each of a plurality of processors a number of wavelengths for interconnect communications between the plurality of processors;
receive, from a first processor of the plurality of processors, a request for one or more additional wavelengths;
determine whether an interconnect bandwidth utilization on the fiber loop is less than a threshold;
in response to determining that the interconnect bandwidth utilization on the fiber loop is less than the threshold, reassign, to the first processor, one or more wavelengths that are assigned to a second processor of the plurality of processors;

determine whether a request for returning one or more wavelengths that are reassigned to a third processor of the plurality of processors is received; and in response to determining that the request for returning is received, process the request for returning before reassigning, to the first processor, the one or more wavelengths that are assigned to the second processor.

14. The one or more non-transitory computer-readable storage media of claim 13, wherein the instructions further cause the one or more processors to:

in response to determining that the interconnect bandwidth utilization on the fiber loop is equal to or greater than the threshold, deny the request from the first processor for one or more additional wavelengths.

15. One or more non-transitory computer-readable storage media storing instructions that, when executed by one or more processors, cause the one or more processors to:

assign to each of a plurality of processors a number of wavelengths for interconnect communications between the plurality of processors;

receive, from a first processor of the plurality of processors, a request for one or more additional wavelengths;

determine whether an interconnect bandwidth utilization on the fiber loop is less than a threshold;

in response to determining that the interconnect bandwidth utilization on the fiber loop is less than the threshold, reassign, to the first processor, one or more wavelengths that are assigned to a second processor of the plurality of processors;

determine whether a time period in which interconnect bandwidth of the fiber loop is oversubscribed is greater than a time threshold; and in response to determining that the time period is greater than the time threshold, determine whether there is a reassigned wavelength that has not been returned.

16. The one or more non-transitory computer-readable storage media of claim 15, wherein the instructions further cause the one or more processors to:

in response to determining that there is a reassigned wavelength that has not been returned, transmit a notification to one of the processors that borrows the reassigned wavelength, wherein the notification requests the one of the processors to return the reassigned wavelength.

17. The one or more non-transitory computer-readable storage media of claim 15, wherein the instructions further cause the one or more processors to:

in response to determining that there is no reassigned wavelength in the fiber loop, determine whether the one or more additional wavelengths requested by the first processor is greater than a maximum number of wavelengths that are allowed to be borrowed in the fiber loop; and in response to determining that the one or more additional wavelengths requested by the first processor is not greater than the maximum number of wavelengths that are allowed to be borrowed in the fiber loop, transmit the request from the first processor for the one or more additional wavelengths to the second processor.

* * * * *